United States Patent
Grauer et al.

(10) Patent No.: US 6,510,949 B1
(45) Date of Patent: Jan. 28, 2003

(54) FILTER MATERIAL HAVING ADJUSTABLE WETTABILITY AND METHOD FOR ITS MANUFACTURE

(75) Inventors: Günter Grauer, Gernsbach (DE); Yves Le Brech, Scaer (FR)

(73) Assignee: PAPCEL - Papier und Cellulose, Technologie, Und Handels-GmbH, Gernsbach (DE)

(*) Notice: Subject to any disclaimer, the term of this patent is extended or adjusted under 35 U.S.C. 154(b) by 0 days.

(21) Appl. No.: 09/170,099

(22) Filed: Oct. 13, 1998

Related U.S. Application Data
(60) Provisional application No. 60/081,247, filed on Apr. 9, 1998.

(51) Int. Cl.[7] .............................................. B01D 29/11
(52) U.S. Cl. ............ 210/508; 210/500.36; 210/500.35; 210/500.42; 210/500.39; 210/490; 426/84; 426/427
(58) Field of Search ............................ 210/500.36, 508, 210/474, 500.42, 490, 500.35, 500.39, 506, 500.1; 428/325; 426/427, 84; 264/41, 48; 162/158, 179

(56) References Cited

U.S. PATENT DOCUMENTS

| | | | | |
|---|---|---|---|---|
| 4,790,907 A | * | 12/1988 | Mallen et al. | |
| 4,863,601 A | * | 9/1989 | Wittekind et al. | 210/474 |
| 5,151,193 A | * | 9/1992 | Grobe et al. | |
| 5,186,835 A | * | 2/1993 | Masuoka et al. | 210/500.36 |
| 5,294,338 A | * | 3/1994 | Kamo et al. | 210/321.8 |
| 5,397,436 A | * | 3/1995 | Ropberson et al. | |
| 5,407,581 A | | 4/1995 | Onodera et al. | |
| 5,503,746 A | * | 4/1996 | Gagnon | |
| 5,633,316 A | * | 5/1997 | Gartner et al. | 525/54.32 |
| 5,728,634 A | * | 3/1998 | Everhart et al. | 442/237 |
| 5,762,798 A | * | 6/1998 | Wenthold et al. | |
| 5,855,788 A | * | 1/1999 | Everhart et al. | |
| 5,874,004 A | * | 2/1999 | DeWitt | 210/634 |
| 5,897,955 A | * | 4/1999 | Drumheller | |
| 5,906,743 A | * | 5/1999 | Cohen et al. | 210/502.1 |
| 5,951,537 A | * | 9/1999 | Osborn, III | 604/387 |
| 6,159,369 A | * | 12/2000 | Atrohm et al. | 210/500.41 |

\* cited by examiner

Primary Examiner—Ana Fortuna
(74) Attorney, Agent, or Firm—Breiner & Breiner, L.L.C.

(57) ABSTRACT

The invention concerns a filter material characterized in that it is impregnated with an amphiphilic substance or with a hydrophilic and a hydrophobic substance to control the water wettability and water absorption.

15 Claims, 2 Drawing Sheets

FILTER MATERIAL HAVING ADJUSTABLE WETTABILITY AND METHOD FOR ITS MANUFACTURE

This application claims benefit of Ser. No. 60/081,247 filed Apr. 9, 1998.

FIELD OF THE INVENTION

A filter material with improved wettability and water-absorption is provided. The filter material is useful in making brewing bags/pouches, filters and the like.

BACKGROUND OF THE INVENTION

In general, filter bags for cold- and hot-filtering procedures, for example tea bags, coffee bags (also see German Patent Document No. 39 02 298), filter bags for aromas, spices and cooking pouches, for example for rice and vegetables; filter papers for tea and coffee, for the beverage industry, for medical applications and oil and emulsion filtration, are made of heat-sealing and non-heat-sealing filter materials.

It is known in this respect that hydrophilic filter papers swell immediately upon contact with water, namely the paper strongly absorbs moisture and the paper fibers swell, and as a result the number of apertures between the fibers and the size of the apertures change.

As regards, for example, a tea bag filled with highly gas-generating herbs, medicinal plants or tea, the gas pressure so generated may even burst the bag when hot water is poured on it.

Moreover, the strongly hydrophilic action of such a hydrophilic material used to make tea or coffee bags may substantially reduce the time that the tea or coffee is in contact with the boiling water. As a result, the flavor of the coffee or tea and the entailed coloring are degraded.

German Patent Document No. 19 51 360.0 A1, for example, proposes solving this problem by using papers of large pore widths.

Another way to prevent moisture absorption by the paper fibers illustratively is to make them hydrophobic by means of a latex dispersion in the manner suggested in European Patent Document No. 0 632 163 A1, whereby the water absorption becomes practically nil.

However, this hydrophobic treatment incurs the drawback of substantially longer leaching of a tea bag so made on account of its water-repellant properties than is the case for an untreated, conventional bag.

A further drawback so incurred is that a tea bag which can be wetted only with difficulty on account of such treatment and over which is poured hot water, immediately after such pouring tends to float to the water surface. At this surface, however, the water temperature is known to be lower than at the middle and lower part of the container. Furthermore, with only part of the bag being surrounded by water, the leaching of the contents is decelerated.

The filtering time of the water in the filter may be raised to such an extent in a tea or coffee filter made of such a hydrophobically treated filter material that there is danger, where beverage machines are concerned, that the liquid will-overflow the filter.

OBJECTS OF THE INVENTION

Accordingly, it is the objective of the present invention to control the water-wettability and the water-absorption of the filter material., that is to appropriately treat this filter material, to achieve amphiphilic interaction between the hydrophobic and hydrophilic properties of the filter material in such a manner that, following manufacture into a brewing bag/pouch or a filter, the above cited drawbacks are precluded. Another objective of the present invention is a method for the manufacture of such a filter material.

Embodiments of the inventive filter material as well as methods of manufacture of such a filter material are described below and set forth in the claims.

DESCRIPTION OF PRESENTLY PREFERRED EMBODIMENTS

Figure 1:
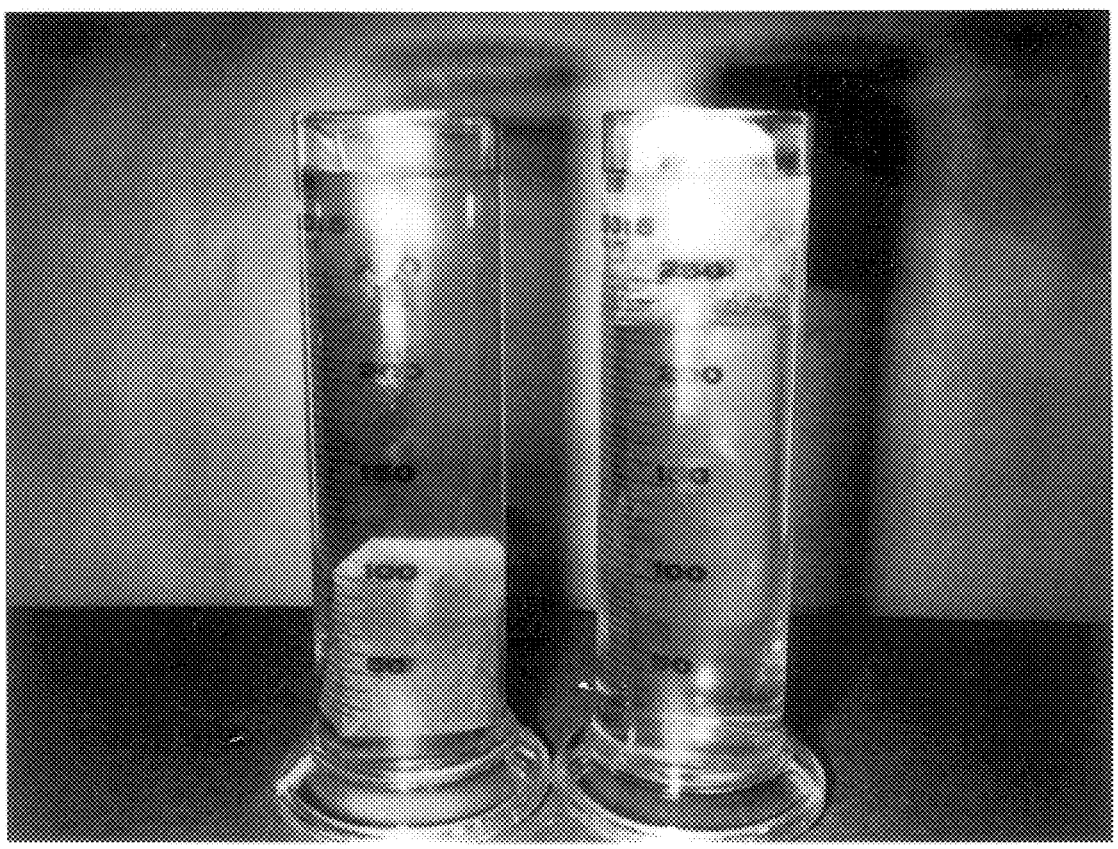
FIG. 1 shows a tea bag, on the right side, of which the paper has been processed only hydrophobically and which, when being brewed, will float at the surface, part of the bag not being wetted by the water.

The filter material of the invention is impregnated with an amphiphilic substance or a hydrophobic and a hydrophilic substance and appropriately has a basis weight of 10 to 120 $g/m^2$, preferably 12 to 40 $g/m^2$, the filter material being non-hot-sealing or also hot-sealing.

The filter material of the invention offers controlled water-wettability and water-absorption. The expression "controlled water-wettability and water-absorption" is to be construed as follows herein: the water wettability and the water absorption of the filter material is located between a fully hydrophobic filter material (0%) and a fully hydrophilic material (100%). Appropriately the filter material of the invention offers a water wettability and water absorption in the range of 10 to 90%, preferably from 10 to 50%. Illustratively, the water wettability and water absorption can be determined by a suction-head test, that is, the more hydrophilic the material (if the hydrophilization agent is larger), the higher the suction head. In the invention, the suction head test was carried out under the conditions of DIN 53106 (synonymous with ISO 8787).

The following are some of the hydrophobic substances appropriate for impregnating the filter material:

Copolymers of styrene and maleic acid anhydride, copolymers of styrene and butadiene, polystyrene (PS), polyethylene (PE), polypropylene (PP), polyvinylchloride (PVC), polyvinylacetate (PVAc), polyacrylamide, polymethacrylates, polyacrylates, polytetrafluoroethylene (PTFE), polyvinylidene chloride (PVDC), polyvinylidene-fluoride (PVDF), silicone resins, terpene resins, ketone resins, coumarone resins, copolymers of styrene and acrylic acids such as the copolymer of n-butylacrylate and styrene, ethylcellulose (EC), cellulose acetate and dimethyl polysiloxanes, preferably copolymers of styrene and maleic acid anhydride, copolymers of styrene and butadiene and copolymers of styrene and acrylic acid, in particular the copolymer of n-butylacrylate and styrene.

The hydrophilic substances suitable to impregnate the filter material include the following:

Polyethylene glycols (PEG), methylcellulose (MC), hydroxypropylmethylcellulose (HPMC), hydroxypropyl cellulose (HPC), hydroxypropylmethylcellulosephthalate (HPMCP), polyvinylpyrrolidone (PVP), polyvinyl alcohol (PVA), polyacrylic acids, gelatins, alginates and sulfosuccinates, preferably sulfo-succinates, especially sodium dialkyl sulfosuccinate.

Amphiphilic substances to impregnate the filter material include the following:

Carboxymethylcellulose (CMC), cellulose acetate phthalate (CAP), polyacrylates, surfactants such as soaps, ester sulfonates, fatty alcohol ethoxylates, fatty alcohol ether sulfates, alkylbenzene sulfonates such as dodecyl benzene sulfonate, alkane sulfonates, fatty alcohol sulfates such as lauryl alcohol sulfate, preferably dodecyl benzene sulfonate, carboxymethycellulose, cellulose acetate phthalate, in particular sodium carboxymethylcellulose.

The hydrophobic substances are appropriately added in quantities of 0.5 to 20%, preferably 10% and the hydrophilic substances in quantities of 0.01 to 5%, preferably 0.05% relative to the weight of the paper. For amphiphilic substances, the added quantity is appropriately 0.1 to 3%, preferably 1%.

When the filter material is used for tea bags, the added quantities are preferably 0.05% and 10% or 1%, respectively, for the hydrophilic and hydrophobic or amphiphilic substances.

In the method of the invention to manufacture a filter material of controlled water wettability and water absorption, the filter material is treated with an amphiphilic, or a hydrophobic and a hydrophilic substance.

In general, a filter material is manufactured in a known and conventional manner by depositing an aqueous solution of natural fibers and/or synthetic fibers on a paper machine wire.

When manufacturing a hot-sealing paper, the hot-sealing synthetic fibers are deposited in a second stage on the first layer and are fused by means of a subsequent drying process onto the natural fibers of the first layer to bond with them.

In order to treat the filter material in the manner of the invention with an amphiphilic or with a hydrophobic and a hydrophilic substance, a number of different method steps are available during production to serve as the feed site of the amphiphilic or hydrophobic and hydrophilic substances:

(1) the amphiphilic or hydrophobic and hydrophilic substances can be added, illustratively, in-mass before the material enters the paper machine, (2) moreover, the amphiphilic or hydrophobic and hydrophilic substances can be added in the sizing press (aqueous solution, emulsion, dispersion) during production, (3) there is further feasibility of addition within further method steps, for example, at the spray bar or at the moistening apparatus at the end of production.

The filter material manufactured in the manner of the invention is extremely well suited for making filters for hot or cold filtration, filter bags for beverages or aromas, boiling pouches, filters for medical applications and for filtering emulsions or oils.

The filter material of the invention is especially suitable for making tea bags. Therefore, an object of a preferred embodiment of the present invention is a tea bag made from the filter material of the invention.

FIG. 1, as set forth above, shows a tea bag, on the right side, of which the paper has been processed only hydrophobically and which, when being brewed, will float at the surface, part of the bag not being wetted by the water.

The tea bag on the left, of which the paper has been additionally treated hydrophilically, is at the lower part of the container and is completely wetted. By precisely adjusting the paper to be amphiphilic, the tea bag made from it can be held, for example, at the middle of the vessel where the temperature is known to be very high and infusion takes place fastest.

Figure 2:
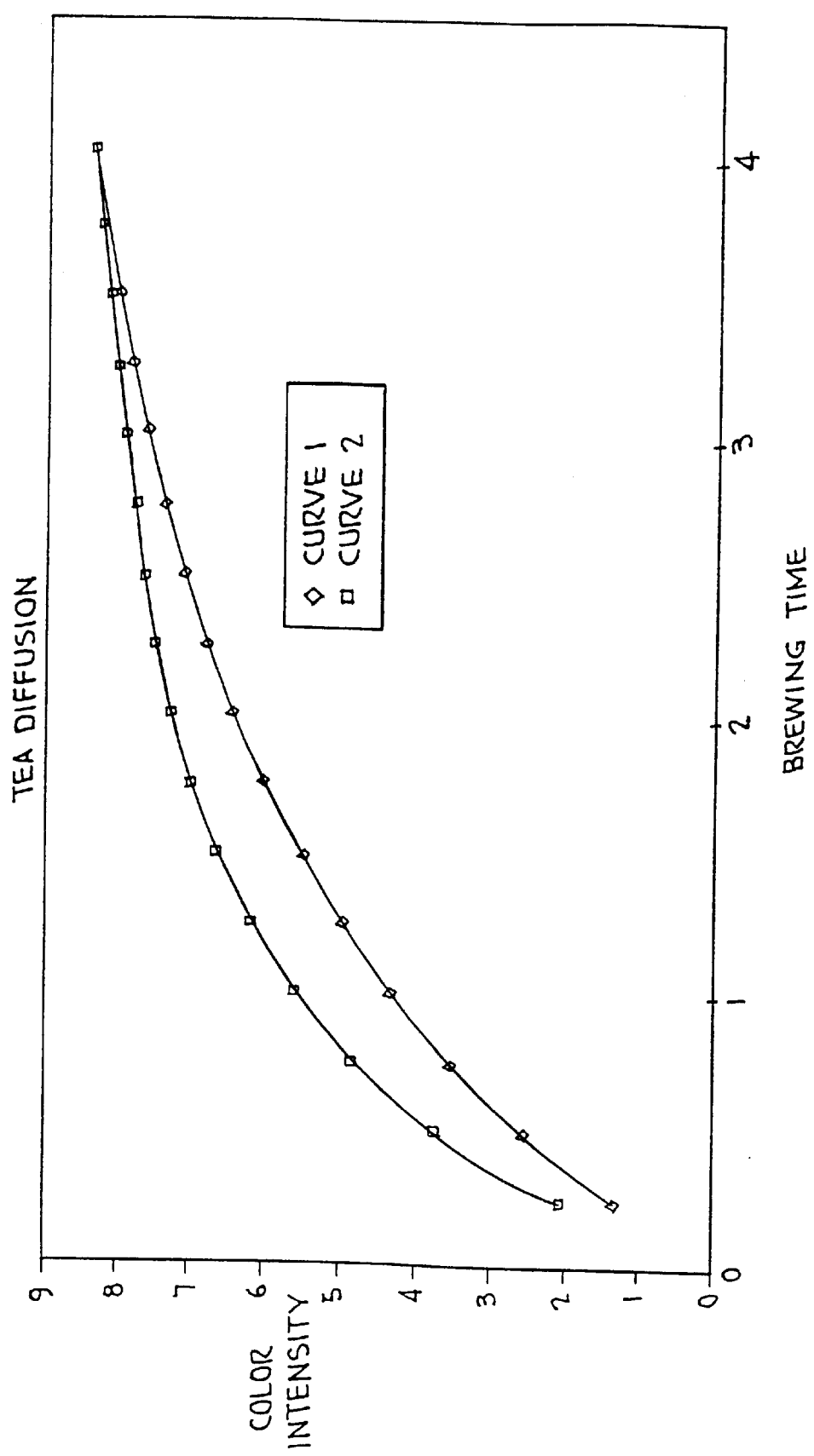
FIG. 2 shows the growth of color intensity of the extract when water is poured over the tea bag as a function of time.

FIG. 2, as set forth above, shows the growth of color intensity of the extract when water is poured over the tea bag as a function of time.

Curve 1 shows the color growth of an extract from a tea bag manufactured solely from a hydrophobically treated filter material. Curve 2 shows the color growth of an extract from a tea bag made from a filter material that was additionally made hydrophilic. The more rapid color growth (curve 2) within about 2 min. is clearly shown for the tea bag which was additionally made hydrophilic.

Color growth is accompanied by a growth in tastiness, which is important precisely within the first 2 min. because the ordinary tea drinkers' brewing times are becoming ever shorter.

With regard to the measurement procedure of color growth, a tea bag is brewed inside a glass beaker and the liquid is kept stirred by a magnetic stirrer.

A continuously operating pump moves the tea water through a cell in a spectral photometer. Next, the spectral absorption of the light (y axis) of the tea water is determined at a given wavelength as a function of time (x axis).

As will be apparent to one skilled in the art, various modifications can be made within the scope of the aforesaid description. Such modifications being within the ability of one skilled in the art form a part of the present invention and are embraced by the appended claims.

What is claimed is:

1. A filter material which controls water-wettability and water absorption comprising a filter paper composed of natural and/or synthetic fibers wherein the filter paper is impregnated with at least one hydrophilic substance, and at least one hydrophobic substance, sufficient to achieve amphiphilic interaction between hydrophobic and hydrophilic properties of said filter paper to provide controlled water-wettability and water absorption, and wherein the filter paper following impregnation has a basis weight between about 10 and 120 g/m$^2$.

2. Filter material as claimed in claim 1 wherein the basis weight is between about 12 and 40 g/m$^2$.

3. Filter material as claimed in claim 1 or 3 wherein the at least one hydrophobic substance is at least one substance as follows: copolymers of styrene and maleic acid anhydride, copolymers of styrene and butadiene, copolymers of styrene and acrylic-acid, polystyrene, polyethylene, polypropylene, polyvinylchloride, polyvinylacetate, polyacrylamide, polymethacrylates, polyacrylates, polytetrafluoroethylene, polyvinylidene chloride, polyvinylidene fluoride, silicone resins, terpene resins, ketone resins, cumarone resins, ethylcellulose, cellulose acetate, and dimethyl polysiloxanes.

4. Filter material as claimed in claim 1 or 3 wherein the at least one hydrophilic substance is at least one substance as follows: polyethylene glycols, methylcellulose, hydroxypropylmethylcellulose, hydroxypropyl cellulose, hydroxypropylmethylcellulosephthalate, polyvinylpyrrolidone, polyvinyl alcohol, polyacrylic acids, gelatins, alginates, and sulfosuccinates.

5. Filter material as claimed in claim 1 or 3 wherein the at least one hydrophobic substance is present in relation to said filter paper in a proportion of 0.5 to 20% of the basis weight of the filter paper.

6. Filter material as claimed in claim 1 or 3 wherein the at least one hydrophobic substance is present in relation to said filter paper in a proportion of 10% of the basis weight of said filter paper.

7. Filter material as claimed in claim 1 or 3 wherein the at least one hydrophilic substance is present in relation to said filter paper in a proportion of 0.01 to 5% of the basis weight of said filter paper.

8. Filter material as claimed in claim 1 or 3 wherein the at least one hydrophilic substance is present in relation to said filter paper in a proportion of 0.05% of a specific surface weight of said filter paper.

9. Filter material as claimed in claim 1 or 3 wherein the filter paper impregnated is a heat-sealing filter paper.

10. Filter material as claimed in claim 1 or 3 wherein the filter paper impregnated is a non-heat sealing filter paper.

11. A tea bag made from the filter material which controls water-wettability and water absorption of claim 1 or 2.

12. Use of the filter material which controls water-wettability and water absorption as claimed in claim 1 or 2 to manufacture a filter useful in aqueous hot or aqueous cold filtration, for filter bags for beverages and aromas, boiling pouches, filters for medical applications, and filters for emulsions or oils.

13. Use as claimed in claim 1 or 2 wherein the filter material is used to manufacture tea bags, tea filters, coffee pouches and coffee filters.

14. A tea bag made from a filter material which controls water-wettability and water absorption, said filter material comprising a filter paper composed of natural and/or synthetic fibers wherein the filter paper is impregnated with at least one hydrophilic substance and at least one hydrophobic substance, sufficient to achieve amphiphilic interaction between hydrophobic and hydrophilic properties of said filter paper to provide controlled water-wettability and water absorption.

15. Use of a filter material which controls water-wettability and water absorption to manufacture tea bags, tea filters, coffee pouches, and coffee filters, wherein the filter material comprises filter paper composed of natural and/or synthetic fibers, wherein the filter paper is impregnated with at least one hydrophilic substance and at least one hydrophobic substance, sufficient to achieve amphiphilic interaction between hydrophobic and hydrophilic properties of said filter paper to provide controlled water-wettability and water absorption.

* * * * *

UNITED STATES PATENT AND TRADEMARK OFFICE
CERTIFICATE OF CORRECTION

PATENT NO. : 6,510,949 B1
DATED : January 28, 2003
INVENTOR(S) : Günter Grauer et al.

It is certified that error appears in the above-identified patent and that said Letters Patent is hereby corrected as shown below:

<u>Title page,</u>
Insert the following:  -- [30] Foreign Application Priority Data
20 March 1998 (EP) …….. 98105114.7 --.

<u>Column 2,</u>
Line 1, "material.," should read -- material, --.

<u>Column 4,</u>
Lines 40, 51, 58, 62 and 66, "1 or 3" should read -- 1 or 2 --.

<u>Column 5,</u>
Lines 3, 7 and 9, "1 or 3" should read -- 1 or 2 --.

Signed and Sealed this

Third Day of June, 2003

JAMES E. ROGAN
*Director of the United States Patent and Trademark Office*